R. F. KREITER.
CHECK VALVE.
APPLICATION FILED AUG. 15, 1905. RENEWED OCT. 2, 1908.

935,118.

Patented Sept. 28, 1909.

WITNESSES:
D. E. Wilson
F. E. Guitut

INVENTOR,
Richard F. Kreiter
By Paul Synnestvedt
Atty.

UNITED STATES PATENT OFFICE.

RICHARD F. KREITER, OF HOUSTON, TEXAS, ASSIGNOR TO MAHLON E. LAYNE, OF HOUSTON, TEXAS.

CHECK-VALVE.

935,118.    Specification of Letters Patent.    Patented Sept. 28, 1909.

Application filed August 15, 1905, Serial No. 274,323.    Renewed October 2, 1908.    Serial No. 455,852.

*To all whom it may concern:*

Be it known that I, RICHARD F. KREITER, a citizen of the United States, residing at Houston, in the county of Harris and State of Texas, have invented certain new and useful Improvements in Check-Valves, of which the following is a specification.

My invention relates particularly to such valves as are used in well drilling and in positions where it is desired to confine the flow of fluid around a rod or pipe; that is, where a rod or pipe is inside another pipe or a casing the valve is required to prevent back flow around the inner member. The objects of the invention are, to provide an easily applied and removed back-flow valve designed to engage outside a member passing through it; to provide an automatic flap-valve made in parts which will coöperate and closely confine the fluid around a pipe passing between the parts; to provide improved means for manually opening a sectional check valve, and to provide for accurately seating and closing the same in position by means of the pressure, and to generally improve the structure and operation of back pressure or check valves. These objects and other advantages hereinafter to appear, I attain by means of the construction illustrated in a preferred form as applied to two concentric pipes, in the accompanying drawing, wherein—

Figure 1:
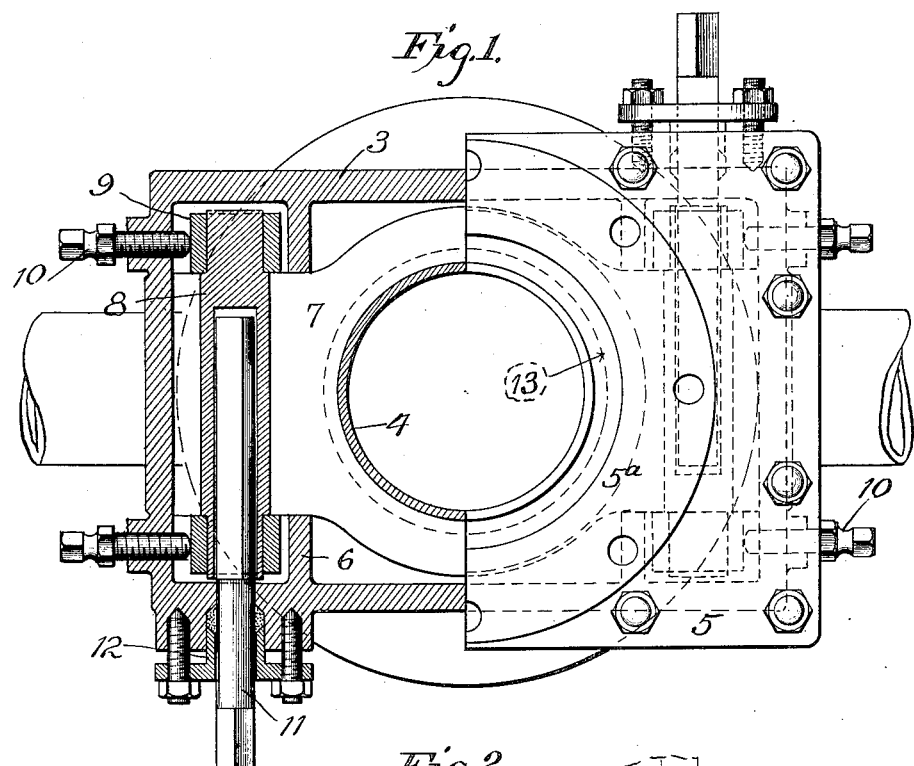
Figure 2:
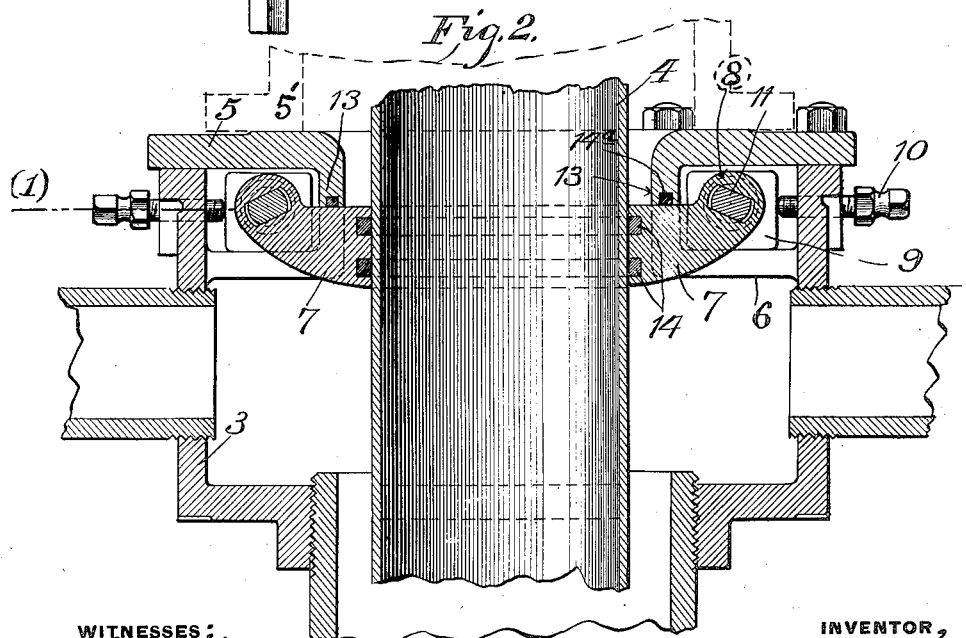

Figure 1 is half a horizontal section and a partial plan view of the valve casing, the section being taken on line (1) in Figure 2; and Figure 2 is a central vertical section through the casing and a portion of pipe confined by the valve.

In many positions such as in driving oil wells, or pumping, one pipe is inclosed in another and it is desired to intercept any upward flow of water or gas between the two pipes but to allow downflow. It is convenient to have an easily removable valve which will automatically engage the inner pipe to prevent flowing out of gas or water, but is opened easily downward. For this purpose it will be seen by the drawing that I have provided a partly closed box or casing 3, through which the interior pipe 4 may pass. If a well casing or large pipe is attached above it will be closed by a cover 5 which has an annular seat $5^a$, and bolt holes to which it may be attached, otherwise these parts close the casing against gas or water in the smaller pipes indicated. The cover 5 of the casing 3 has an open space considerably larger than the interior pipe 4 and to close it I have provided a pair of coöperating semi-circumferential valves 7 which are mounted upon trunnions 8 and having bearings 9 in the boxes 6 on the casing, the bearings being adjusted to and from the center line of the pipe by means of adjusting screws 10. This trunnion 8 pivots the valve 7 so that it may open downward, or close flat against the depending annular flange 13 on the cover. The valve may be opened manually when desired by means of shafts 11 which extend through the side of the casing 3 through a packing box 12 and engage an elongated slit in the trunnion 8 as seen in Figure 2.

The top of the casing 3 being fixed on the end of a closed chamber or pipe, its downward depending annular rib 13 having a packing $14^a$ therein engaging the flat top surfaces of the two valves 7 closes the space fully. The valves have in their semi-circular faces a pair of packing rings 14 in order to make a tight fit against the pipe 4, and by means of the screws 10 the bearing blocks of the pivoted valves may be moved in order to properly adjust the contacting surfaces.

By this device it will be seen that the back flow from the lower side of the box 3 is effectually checked by an automatic valve which is removed with perfect ease, and which allows of the central pipe 4 being pushed farther down without obstruction when desired. The valves 7 are easily adjustable to any desired position to accommodate variations in the size of the interior pipe and the whole valve may be readily removed by unbolting the top flange. Other advantages of the device will readily occur to those familiar with the art.

Having thus described my invention and illustrated its use, what I claim as new and desire to secure by Letters Patent, is the following:

1. The combination of a partially closed casing and a sectional pivoted valve mounted therein and having its parts adapted to swing together in contact with the casing and with a pipe or rod running through the casing and the valve.

2. The combination with a casing provided with a chamber and a smaller pipe inside the same, of a partial closure plate for the large chamber and a pair of semi-circumferential flap valves pivoted in the casing and adapted for engaging the interior pipe and the plate, substantially as described.

3. In a check valve for wells the combination with a supporting box 3, of a removable top to the box having a depending annular flange forming a seat for the valves, a pair of valves pivoted in said box adapted to engage the depending flange of the lid and also to engage a pipe placed inside of the box, whereby the fluid pressure automatically closes the said valves against the pipe and against the said seat, substantially as described.

4. In a well check valve the combination of a pair of semi-circumferential valves pivoted upon adjustable trunnions and adapted to swing against and away from a pipe placed between them, a casing supporting said trunnions and having a downwardly projecting annular flange adapted to also engage the valves, substantially as described.

5. The combination with a casing, of a pair of semi-circumferential trunnioned flap valves and means for adjustably mounting them upon pivots in the casing, an operating stem loosely engaging slits in the valve trunnions and a packing box surrounding the stem, whereby the valve may be operated from outside of the valve casing, substantially as described.

In witness whereof I have hereunto signed my name in the presence of two subscribed witnesses.

RICHARD F. KREITER.

Witnesses:
W. P. HAMBLEN, Jr.,
A. R. HAMBLEN.